United States Patent [19]

Park

[11] 3,939,469
[45] Feb. 17, 1976

[54] DETECTION STREAMER

[75] Inventor: Robert H. Park, Bernardsville, N.J.

[73] Assignee: The United States of America as represented by the Secretary of the Navy, Washington, D.C.

[22] Filed: Dec. 29, 1944

[21] Appl. No.: 570,227

Related U.S. Application Data

[62] Division of Ser. No. 526,624, March 15, 1944.

[52] U.S. Cl............... 340/10; 340/8 FT; 340/16 R; 310/9.1; 29/594
[51] Int. Cl.² ........................................... G01V 1/38
[58] Field of Search ............... 340/10, 61, 16, 3, 38, 340/5 D, 7 R, 8 FT, 10, 16 R; 310/9.1; 29/594

[56] References Cited
UNITED STATES PATENTS 2,384,465    9/1945    Harrison .................... 177/386.2
2,404,764    7/1946    Hayes ....................... 177/386.2
2,408,028    9/1946    Batchelder ................. 177/386.2
2,440,903    5/1948    Massa ....................... 177/386.2
2,447,333    8/1948    Hayes ....................... 177/386.2

*Primary Examiner*—Maynard R. Wilbur
*Assistant Examiner*—Nelson Moskowitz

[57] ABSTRACT

This invention relates to detecting devices and more particularly to a new and improved torpedo detection streamer having a plurality of microphonic detecting devices arranged therein in such a manner as to render the detection streamer substantially directionally and uniformly responsive to sound signals received from torpedoes passing above or below the streamer at any point along the length thereof.

4 Claims, 12 Drawing Figures

Inventor
R. H. PARK
By
Attorney

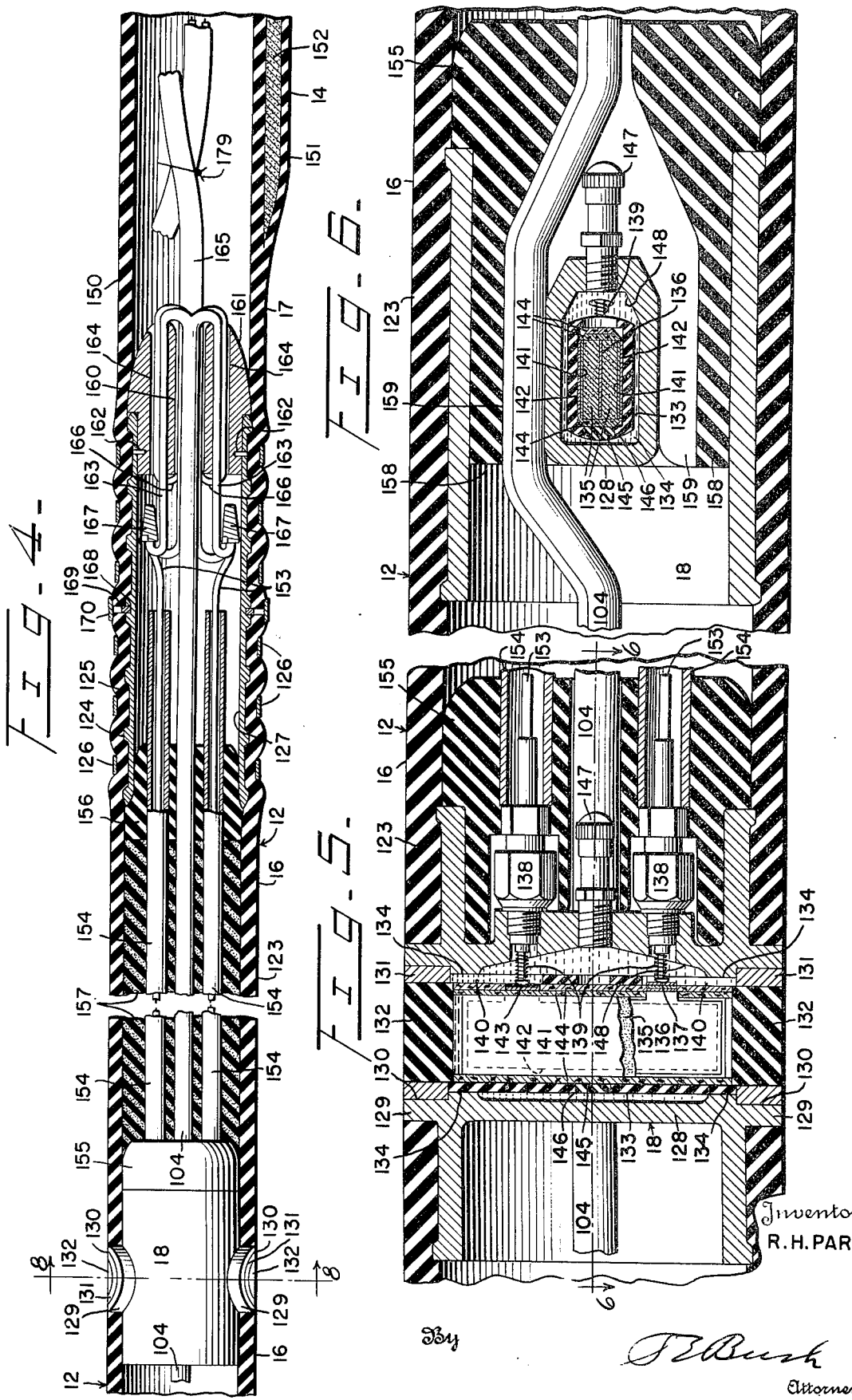

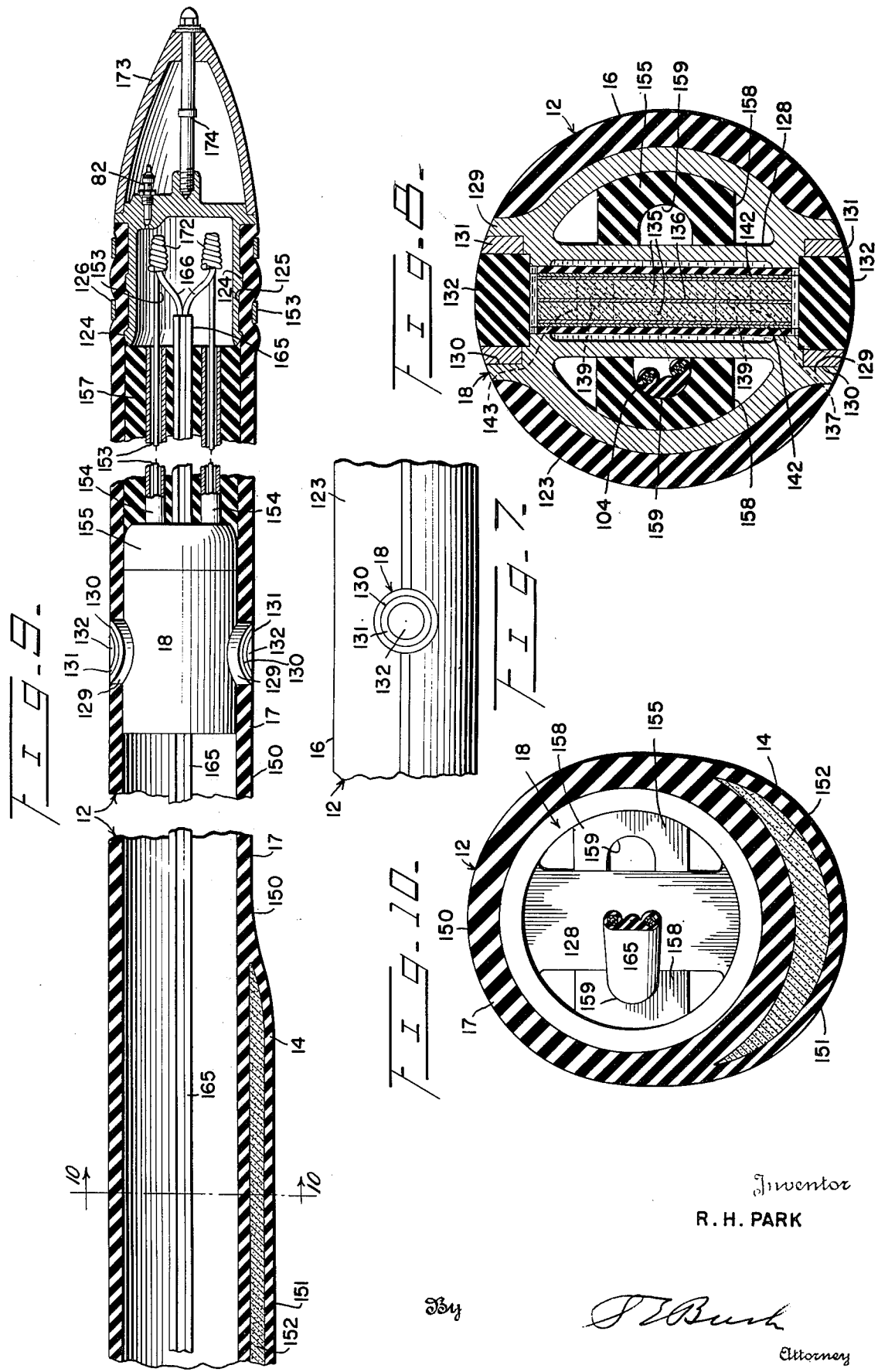

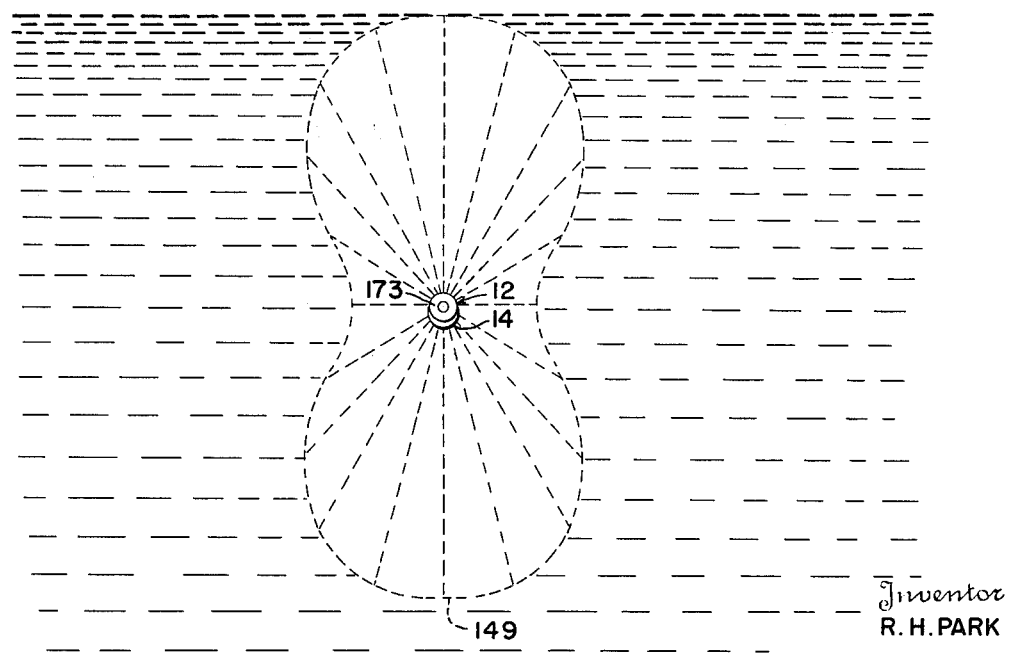

DETECTION STREAMER

This application is a division of a joint application of Robert H. Park et al., Ser. No. 526,624, filed Mar. 15, 1944.

The invention is particularly suited for use with the arrangement described and claimed in the copending application of Nelson N. Estes for Anti-Torpedo System, Ser. No. 517,201, filed Jan. 6, 1944, now U.S. Pat. No. 2,979,015, in which a plurality of explosive streamers disposed at different distances beyond a detection streamer within the path of travel of a torpedo are selectively fired in predetermined time delayed relation to the transit or instant of passage of the torpedo with respect to the detection streamer by means of a control mechanism adapted to operate in closely timed relation to the maximum response of the detection streamer to signals received from the torpedo moving with respect thereto, the transit of the torpedo with respect to the detection streamer being substantially synchronized with the maximum response sensitivity of the streamer thereby providing a datum point from which accurately to time the selective firing of the explosive streamers in accordance with the time of travel of the torpedo in moving from the detection streamer into a predetermined position with respect to the explosive streamers.

It has been observed in microphonic devices employed with anti-torpedo systems prior to the system disclosed in the aforesaid application of Nelson N. Estes that the changes of received intensity of the torpedo signal, introduced by the azimuthal variations of the sensitivity of the microphonic devices, produce a signal effect in advance of the principal signal effect produced by the torpedo's propellers. This condition is particularly true of a torpedo passing the microphonic devices at a relatively great distance above or below the same. Accordingly, in the prior systems, response of the control mechanism to an advanced signal results in anticipatory firing of the explosive charge, which condition is compensated for by means of an interposed filter giving a time delay, thereby to prevent premature firing of the charge. However, in the case of the prior systems, when the microphonic devices respond to the principal signal, in the case of a torpedo passing relatively near to the microphonic devices, the time delay inherent in the filter and the control mechanism may be sufficient to cause firing of the charge far in arrears of the torpedo thereby only to urge it additionally onward toward its mission of destruction.

The detection streamer of the present invention comprises an elongated hose-like member having a plurality of electrically interconnected microphonic devices integrally formed therein and disposed at intervals along the length thereof. Each microphonic device, thus employed, comprises transducer means of a type adapted alternately to expand and contract upon application of an alternating electric or pressure signal thereto, and each transducer means is arranged in vibration transmitting relation with respect to a pair of diametrically disposed windows or wall portions of the hose-like member, vibration transmitting liquid having substantially the same acoustic impedance as sea water being interposed between the transducer means and the windows, and the windows being formed of material also having the same acoustic impedance as sea water whereby pressure pulses received through the surrounding water are transmitted, substantially unchanged, through the windows and liquid to the transducer means. By reason of this design, each microphonic device provides a smooth response pattern which is substantially in the form of a vertical dumbbell of sufficient size to produce an overlapping of the response patterns of adjacent devices thereby to render the detection streamer substantially uniformly responsive to signals received from a torpedo passing above or below the streamer at any point along the length thereof. Furthermore, the vertical dumbbell response patterns, being free of extreme azimuthal variations provide a maximum sensitivity for the microphonic devices in a vertical direction, which direction is substantially maintained throughout the length of the streamer by the addition thereto of suitable material adapted to be influenced by gravity in a manner to produce the desired orientation of the streamer. Morever, the dumbbell patterns give the maximum sensitivity in a vertical plane above and below the streamer and cause the signal intensity from the torpedo to increase more rapidly as the torpedo passes through the vertical plane of the detection streamer, thereby substantially reducing variations in the electrical output of the streamer prior to the transit of the torpedo with respect thereto. The construction of the microphonic devices also renders the same responsive to a frequency suitable for the purpose such, for example, as a frequency substantially within the range of 47 to 55 kilocycles per second. This frequency range is well adapted for operation of an acoustically responsive torpedo detection device of the type disclosed herein since the discrimination of the dumbbell patterns of the microphones against ship noise with respect to the transit torpedo noise substantially obviates the danger of spurious response of the device to the noise of the vessel.

Accordingly, by use of the directionally supported microphonic devices of the above described type, a closely defined relation or datum point is established between the transit of a torpedo with respect to the detection streamer and the maximum response sensitivity thereof, the maximum response of the streamer to signals received from the torpedo occurring at the moment that the torpedo's propellers pass the streamer. Such a detection streamer, therefore, is well adapted to initiate the operation of a control mechanism such, for example, as the mechanism employed in the system of the aforesaid application of Nelson N. Estes in which the effective operation of the system necessitates a datum point from which predetermined time delays are interposed by the mechanism upon operation thereof.

A broad object of this invention is to provide new and improved means for detecting the approach of a torpedo.

Another object of the invention is the provision of a new and improved detection streamer in which the maximum response sensitivity of the streamer is closely related to the transit of a torpedo with respect thereto.

Another object of the invention is the provision of a new and improved detection streamer which is substantially directionally and uniformly responsive to torpedoes passing above or below the same at any point along the length thereof.

Another object of the invention is the provision of a new and improved detection streamer having novel means for maintaining a desired orientation thereof.

An additional object of the invention is the provision of an elongated flexible tube having a plurality of transducer means disposed therein at intervals along the length thereof and in vibration transmitting relation with a plurality of pairs of diametrically disposed wall portions or windows of the tube respectively.

Still other objects of the present invention are those inherent in the novel construction, combination, and arrangement of parts which will become manifest upon examination of the following specification, reference being had to the accompanying drawings wherein:

FIG. 4 is a fragmentary vertical sectional view of the short streamer section and the standard streamer section attached thereto taken substantially through the center thereof;

FIG. 5 is an enlarged view in section of the microphone unit shown in FIG. 4;

FIG. 6 is a sectional view taken along the line 6—6 of FIG. 5;

FIG. 7 is a plan view of a portion of the detection streamer containing the microphone unit;

FIG. 8 is a sectional view taken along the line 8—8 of FIG. 4;

FIG. 9 is a vertical sectional view partly broken away of the tail portion of the detection streamer taken substantially along the center thereof;

FIG. 10 is a sectional view taken along the line 10—10 of FIG. 9;

FIG. 11 is a diagrammatic view of the vertical dumbbell response pattern of the detection streamer as viewed from the end of the streamer; and, FIG. 12 illustrates in diagrammatic form the electrical circuit of the detection streamer according to the preferred embodiment of the invention.

Figure 1:
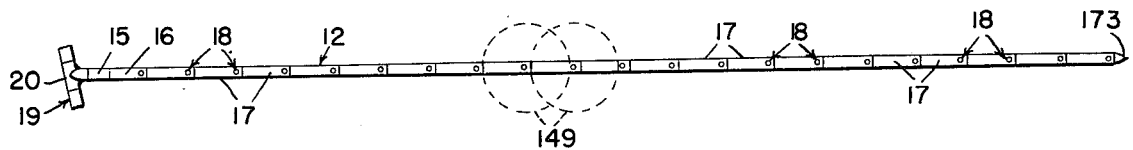
FIG. 1 shows in diagrammatic form a plan view of a detection streamer and the response patterns of the microphonic devices thereof according to a preferred embodiment of the invention.
Figure 2:
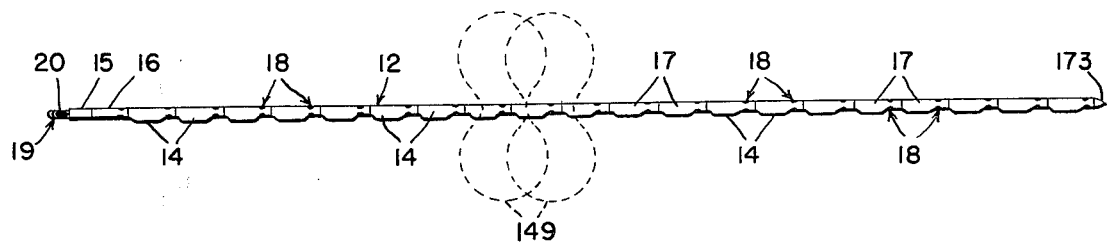
FIG. 2 is a view in elevation of the arrangement shown in FIG. 1.

Referring now to the drawings in which like reference characters are used to designate like or similar parts, and more particularly to FIGS. 1 and 2 thereof, there is shown thereon in diagrammatic for, an elongated flexible tubular or hose-like member indicated generally by the numeral 12 and hereinafter generally referred to as a detection or acoustic streamer. The acoustic streamer comprises a towing head 57, FIG. 3, a buffer section 15, a short intermediate section 16, a plurality of standard sections 17, and a streamlined tail cap 173 coupled end to end to form a single streamer.

The short section 16 and each of the standard sections 17 has integrally molded therein near the trailing end thereof a microphonic device generally designated by the numeral 18 and hereinafter generally referred to as a microphone unit. Each microphone unit is designed to provide a substantially dumbbell-shaped response pattern 149 to a sound signal received from a torpedo passing above or below the microphone unit, the detection streamer, during the operation thereof within a body of water, being maintained therein at a predetermined depth of submergence such, for example, as 20 feet as illustrated in FIG. 11.

The response patterns 149 are of such a size as to produce an overlapping of the patterns of adjacent units sufficient to provide a substantially uniform field of reception to a signal received from a torpedo moving transversely with respect to the detection streamer at any point along the length thereof, and the dumbbell-shaped cross section of the field gives the maximum sensitivity of the streamer to the signal received thereby in a vertical plane above and below the streamer, the maximum response of the streamer occurring at the moment that the torpedo's propellers pass through the vertical plane. Thus, a close relation is established between the maximum response of the detection streamer and the transit or instant of passage of the torpedo with respect thereto.

The maximum sensitivity of the detection streamer is maintained in the vertical direction by means of the eccentric loading 14 on the underside of each of the standard sections 17, and the streamer, except for the buffer section thereof, is hermetically sealed and adapted to receive air under pressure therein thereby to maintain the streamer substantially neutrally buoyant and to prevent the collapse thereof at a predetermined depth of submergence within the water as will appear in greater detail as the description proceeds.

When the detection streamer 12 is employed in a system for protecting a moving vessel against torpedo attack, the streamer is adapted to be towed through the water by means of a suitable tow cable 19 therefor having a coupling member 20 to which the towing head 57 of the streamer is adapted to be coupled upon launching the streamer within the water, the towing head being provided with connecting devices adapted to engage interfittingly corresponding devices carried by the tow cable thereby to establish electrical and air connections therewith when the towing head is mechanically secured to the tow cable.

The towing cable 19 may be of any type suitable for the purpose such, for example, as the towing cable disclosed in the copending application of Harold W. Klas, for Faired Towing Means For Anti-Torpedo Device, Ser. No. 483,105, filed Apr. 15, 1943, which towing cable is adapted to serve as a pneumatic supply line and a short electrical transmission line for connecting the streamers secured thereto to a source of air under pressure and an electrical control mechanism respectively, the air source and control mechanism being carried on the towing vessel.

Figure 3:
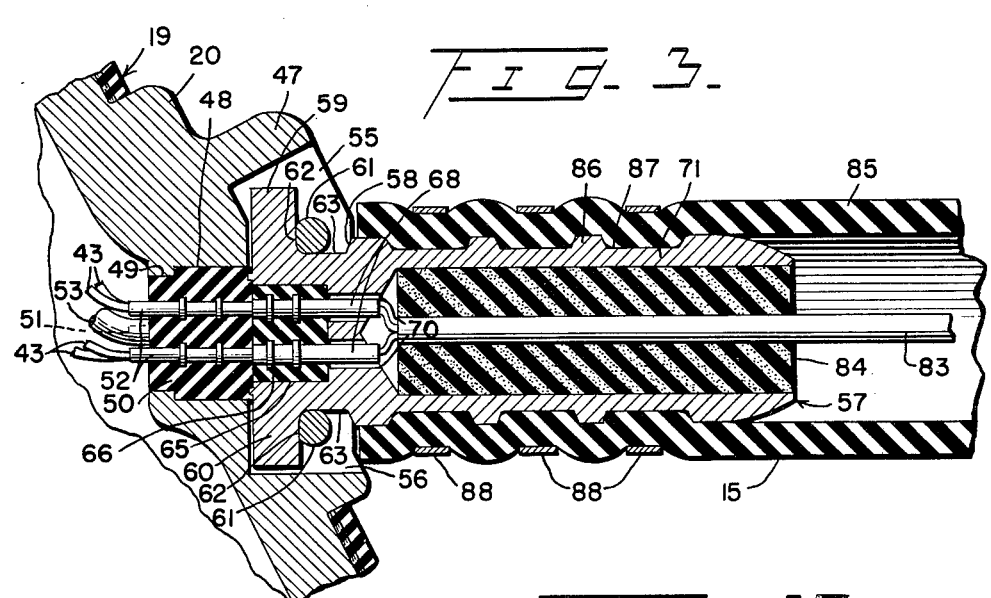
FIG. 3 is an enlarged sectional view of the towing head for the detection streamer shown in FIGS. 1 and 2 and illustrates the manner of attachment thereof to a suitable tow cable therefor.
Figure 12:
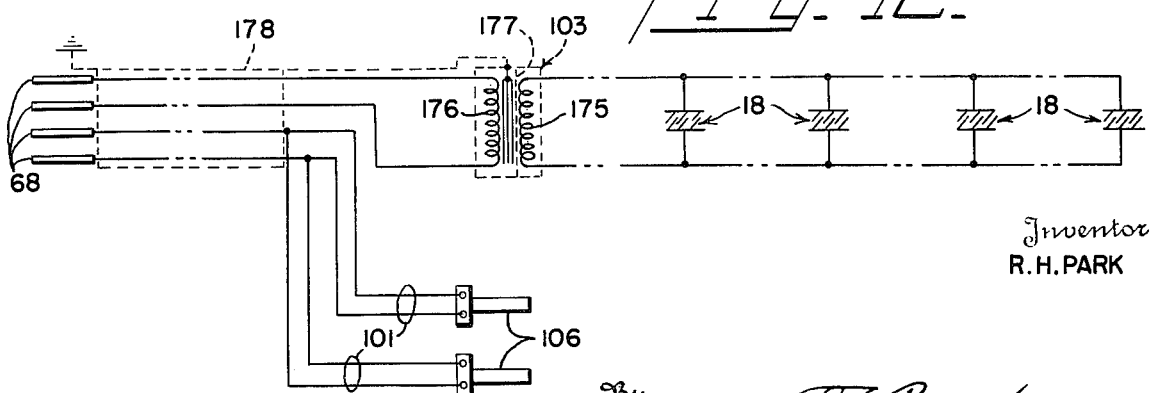

Referring now to FIG. 3, it will be seen that the coupling 20 is provided with a projection 47 which extends in a direction generally parallel to the course of the towing vessel. Extending through the projection 47 is a bore 48, the inner end of which is reduced at 49 to serve as a seat for a plug 50. The plug 50 may be of any suitable material such, for example, as hard rubber having embedded therein an air fitting 51 and a plurality of terminal prongs 52. The fitting 51 is connected to the air line within the towing cable 19 by means of a flexible tube 53 connected therebetween, and each of the terminal prongs 52 is secured as by soldering to one of the plurality of conductors 43 comprising the short transmission line also disposed within the towing cable. The wall of the bore 48 is provided with diametrically arranged slots or grooves 55 and 56 which extend inwardly along the bore to a point slightly beyond the plug 50, the opening provided by the bore and slots being adapted interfittingly to receive the towing head 57.

Referring now to FIG. 3, it will be seen that the towing head has a cylindrical portion 58 and projections 59 and 60 laterally extended therefrom which conform to the bore 48 and grooves 55 and 56 respectively of the coupling 20. The projections 59 and 60 are partially cut away to receive a pair of tapered and threaded pins 61 carried by the coupling 20, the cut surfaces 62 and 63 being inclined to conform to the taper in the pins. Thus, when the towing head is inserted into the opening in the projection 47 of the coupling 20 and the pins 61 are drawn up tight, the towing head is forced into watertight connection with the plug 50 and secured in locked relation with the coupling 20.

The cylindrical portion 58 is provided with a bore 65 which generally extends in alignment with the bore 48 of the projection 47. Inserted within the bore 65 is a plug 66 which may be of hard rubber, for example, having embedded therein an air fitting and a plurality of terminal prongs 68 adapted to be received interfittingly by the fitting 51 and the plurality of prongs 52 respectively when the towing head is locked to the coupling 20.

A microphone unit 18 comprising a casting or rigid sleeve member of substantially tubular configuration is integrally molded in the hose 123 at a point relatively near the trailing end thereof. The casting includes a vertical diametrically extending tubular portion or moisture-proof housing 128 substantially of rectangular cross section. In alinement with the portion 128 and exterior of the casting are diametrically opposed flanges 129 which extend to the outer surface of the hose in flushed relation therewith. Each flange 129 has a bore or opening 130 concentric therewith which communicates with the interior of the tubular portion 128. A ring 131 adapted to be received into each bore 130 in pressed relation therewith contains a plug or window 132 of material suitable for the purpose such, for example, as rubber having the same acoustic impedance as sea water. The plugs may be formed in the rings in any convenient manner, preferably by being molded therein.

Located within the chamber provided by the portion 128 and the plugs 132 is a shell 133 which may be molded of any suitable plastic such as bakelite. The shell is snugly held within this chamber by a reduction in the internal cross section of the portion 128 at 134 which conforms to the periphery of the shell. Disposed within the shell is a transducer device or microphone comprising a pair of piezo-electric crystal elements or salt crystals 135 which preferably are of the type known in the art as Rochelle salt crystals. The crystals are cemented together with an electrode 136 interposed therebetween which may be of metal foil and which serves as the positive electrode of the microphone. A portion of the electrode 136 is brought out into electrical contact with a metallic contact strip 137. The contact strip 137 is yieldably engaged by a terminal 138 carried by the portion 128 of the casting. The terminal has a yieldable contact 139 which extends thru a slot 140 in the shell to contact the strip under pressure.

The sides of the crystals opposite the electrode 136 similarly carry metal foil electrodes 141 which form the negative electrode of the microphone. Two plates 142 of suitable metal are disposed between the electrodes 141 and the shell 133 and are electrically joined by a contact strip 143 of the same material, the contact strip 143 being yieldably engaged by a terminal 138 in the same manner as the terminal strip 137.

The other sides of the crystal assembly are lined with pads 144 of a cork and synthetic rubber composition suitable for the purpose, the thickness of the pads being such as freely to admit the crystal assembly into the shell 133 without producing variations in the transverse static loading of the crystals, as would result should any wedging action occur. The crystal assembly is maintained in a position equi-distant between the windows 132 by means of a button 145 of the same material as the pads 144, the button being inserted through an aperture 146 in the shell 133 into cemented contact with the pad adjacent thereto.

The space between the windows 132 and crystals and between the shell 133 and the portion 128 of the casting provides a chamber into which a vibration transmitting oil is inserted under pressure. The pressure of the oil is made slightly greater than that of the air in the streamer thereby to prevent air from leaking into the chamber, it being understood that the presence of air in the chamber would also introduce variations in the received sensitivity of the crystals by creating dead spots or areas between the windows and crystals. The oil may be of any type which is non-injurious to the action of the transducer means or crystal elements and having an acoustic impedance approximately equal to that of sea water such, for example, as castor oil, whereby sound waves which impinge upon the windows 132 produce the same effect as though the waves contacted the ends of the crystals directly.

The oil is admitted into the chamber through a check valve 147 which enters the chamber at a domed shaped surface 148 thereof. In practice, in order to insure that all air has been excluded from the chamber, the chamber is first evacuated to approximately 200 microns and then is filled with oil under pressure, the hose being positioned so that the valve 147 is uppermost thereby to force any air bubbles through the valve. The oil pressure within the chamber causes the windows to bulge and thus provides a means for visually checking the extent of pressure within the chamber.

A microphone unit, of the construction as disclosed above, and fabricated in the manner disclosed, is substantially free of azimuthal variations in the received sensitivity thereof and provides the aforesaid smooth response pattern 149. Since the pattern is substantially in the form of a vertical dumbbell having a maximum sensitivity along a vertical line extending through the axis of the windows 132, the response of the microphone may be considered to be directional. However, the dumbbell form of the pattern is sufficiently non-directional as to provide the aforesaid overlapping of response patterns of adjacent microphones thereby to provide a substantially uniform field of response or reception to signals received by the acoustic streamer. Accordingly, the maximum sensitivity occurs within a vertical plane passing through the axis of the acoustic streamer at any point throughout the length thereof. This plane of maximum sensitivity is utilized as a datum point from which to time the firing of the explosive streamers associated with the detection streamer when the detection streamer is employed, for example, in the system disclosed in the aforesaid application of Nelson N. Estes. For this purpose it is important to maintain the plane of maximum sensitivity perpendicular to the surface of the water as illustrated in FIG. 17.

In order to safeguard the acoustic streamer against a twisting action while being towed through the water which would defeat the above purpose, each hose 150 of each of the standard sections 17 of the acoustic streamer is provided with an outer wall 151, FIGS. 10, 15, and 16, on the underside thereof which houses a mixture of high gravity stock 152 such as a mixture of lead oxide and rubber. This mixture, being inherently flexible, does not impair the flexible character of the streamer. Accordingly, the streamer is capable of being wound on a suitable reel therefor, preferably with the axis of the phone windows perpendicular to the axis of the reel.

It will be understood that the resonant frequency of the microphone units depends upon the length of the crystal, the size and shape of the microphone unit generally, and other physical characteristics thereof.

The terminals 138 are connected as by soldering to a pair of conductors 153, FIGS. 10, 11, and 15. The conductors are protected by a pair of flexible tubes 154 which, together with the conductor tape 104, extend through and are supported by, a pair of rubber plugs 155 and 156 carried by the microphone casting and coupling 127 respectively, and a suitable cushion filler 157, such as sponge rubber, which is disposed within the hose 123 between the plugs. It will be understood that the plug 155 is also conveniently formed to receive the terminals 138 and valve 147 and is provided with portions 158 which project along the sides of the vertical portion 128 of the microphone casting, FIG. 14. The portions 158 have grooves 159 through one of which the conductor tape 104 is passed, as clearly appears in FIG. 14.

The conductor tape 104 extends through the axial bore 160 of a suitable plug 161 which is inserted into the trailing end of the intermediate coupling 127 and secured therein by means of pins 162. The portion of the tape extending beyond the plug is split and the separated conductors 163 thereof are extended one each through a pair of off-set bores 164 in the plug to a point adjacent to the conductors 153. A second conductor tape 165 disposed within the hose 150 is passed through the bore 160, and the conductors 166 thereof are similarly carried back through the bores 164 and forwardly again through the axial bore 160 to a point adjacent to the conductors 153 and 163. The conductors are bared and spliced, the connection being first bound with rubber tape, not shown, and then conveniently bound with friction tape 167 to provide an air tight splice. By means of the above anchoring arrangement it will be readily understood that any strain in the conductor tapes 104 and 165 is taken up by the plug 161 rather than by the splice between the conductors thereof. As a further precaution to prevent strains in the conductors generally throughout the streamers which result from a flexing thereof, the conductors and cables are provided with sufficient slack as appears, for example, in FIG. 10, the slack or looped portion of the cable being secured in any suitable manner as by the cord 179.

By reason of the foregoing arrangement and construction of the electrical connections between the several microphone units and the cushioning supports for the connections, the detection streamer is capable of receiving shocks applied thereto without impairing the effectiveness of the connections, such shocks being caused, for example, by the explosion of the explosive streamers associated with the detection streamer when the streamer is employed, for example, in an anti-torpedo system of the type disclosed in the aforesaid application of Nelson N. Estes.

It will be seen that the hose 150, which may be of the same material as that of the hose 123, is similarly secured to the coupling 127. The coupling has a centrally disposed groove 168 into which a ring 169 is inserted, and the gap between the hoses 123 and 150 is closed by a clamping device 170 to provide a smooth outer surface and thereby prevent the development of supersonic noises as the streamer is towed through the water.

It will be understood that the construction of each standard section 17 of the acoustic streamer, except for the weighted underside thereof and the difference in length, is identical to that of the short section 16 of the streamer. The standard sections are all identical except that the trailing section contains a cup-shaped tail plug, FIG. 15, 171, rather than an intermediate coupling 127, and the conductors 166 of the conductor tape 165 are connected directly to the conductors 153 of the hydrophone by a splice 172 similar to that of 167. The check valve 82 in the end plug 171 is covered by a tapered tail cap 173 which is secured to the tail plug 171 by means of a bolt 174, the tail cap being streamlined thereby to prevent turbulence of the water and the development of supersonic noises as the streamer is towed through the water.

From the foregoing it should now be obvious that the orientation of the maximum sensitivity of the microphone patterns within the vertical plane of the detection streamer is determined by the disposition of the crystal assemblies within the respective hose sections, the orientation of the several hose sections with respect to each other and to the towing head of the streamer, and the effectiveness of the eccentric loading in overcoming the inherent tendency of the streamer to twist.

In practice, for example, in order to obtain the desired orientation of the streamer, each standard or ballasted section is eccentrically loaded with an amount of the high gravity ballast 152 sufficient to overcome or balance one half of an estimated inherent tendency of the section to twist, and the section thereafter is floated in water to determine the deviation of the plane of the microphone windows from the true vertical plane of the section. In assembling the streamer, the short or unballasted section 16 and the standard section 17 connected thereto are oriented so that the microphone windows thereof lie in a plane perpendicular to the plane of the projections on the towing head, and the standard sections are coupled end to end in such a manner as to compensate from section to section for the aforesaid deviations in the sections.

By reason of the aforedescribed electrical connections of the detection streamer, the microphone units 18 thereof are connected in parallel to the primary winding 175 of transformer 103 and the secondary winding 176 of the transformer is connected to a pair of terminal prongs 68, the other pair of prongs being connected to the detonators 106 as illustrated diagramatically in FIG. 18. Thus, the microphone units and the detonators are adapted to be electrically coupled to a suitable control mechanism therefor by way of the short transmission line 43 within the towing cable 19 when the streamer is mechanically coupled thereto, the transformer 103 being adapted to match the high impedance of the microphone circuits to the low impedance of the transmission line. The transformer preferably is provided with an electrostatic shield 177 which may be connected to the metallic sheath of the transmission line, which sheath may be grounded to the coupling 20, for example, and the connection completed by means of a metallic sheath 178 on the cable connections between the terminal prongs 68 and the transformer, the sheath 178 being grounded to the transformer and to the towing head 57, for example.

From the foregoing, it should now be apparent that a detection streamer has been provided which is well adapted to fulfill the aforesaid objects of the invention. Morevover, it will be further obvious that although the invention has been described in particularity with respect to the detection of torpedoes moving transversely thereto, it will be understood that use of the invention need not be so limited, but also may be employed advantageously in the detection of other automotive devices adapted to be operated on land, sea, or in the air.

While the invention has been described with reference to but a single embodiment thereof which gives satisfactory results, it will be obvious to those skilled in the art to which the invention appertains, after understanding the invention, that the same is susceptible of additional embodiments, modifications, and variations thereof without departing from the spirit and scope of the invention as defined by the appended claims.

The invention herein described and claimed may be manufactured and used by or for the Government of the United States of America for governmental purposes without payment of any royalties thereon or therefor.

What is claimed as new and desired to be secured by Letters Patent of the United States is:

1. In combination with a long flexible tube having two diametrically disposed wall portions adapted to transmit vibrations and sealed at both ends whereby it may be immersed in water, a rigid sleeve member within said flexible tube and supporting a portion of said tube throughout its circumference, said rigid sleeve member having two diametrically disposed openings adjacent said vibration transmitting portions of said tube, transducer means of the type adapted to alternately expand and contract upon the application of an alternating electric or pressure signal, and means for mounting said transducer means within said sleeve member with the end faces thereof in a spaced relationship for hydraulically coupled vibration transmission through said two sleeve openings with the diametrically disposed vibration transmitting wall portions of said flexible tube, said transducer mounting means comprising a substantially moisture-proof housing which extends across said sleeve member between said two openings therein, said transducer means comprising piezo-electric crystal element means flexibly mounted within said substantially moisture-proof housing, the opposite signal sensitive end faces of said piezo-electric crystal element means being spaced from the vibration transmitting wall portions of said flexible tube, and said housing being filled under pressure with vibration transmitting liquid of the same acoustic impedance as the vibration transmitting wall portions which is non-injurious to the action of said piezo-electric crystal element means for acoustically coupling said piezo-electric crystal element means to said vibration transmitting portions of said flexible tube and providing a predetermined constant preloading for said crystal element.

2. In combination with an air-filled flexible tube having two diametrically disposed wall portions adapted to transmit vibrations and sealed at both ends whereby it may be immersed in water, a hydrophone having a substantially uniform dumbbell shaped response pattern, comprising a rigid sleeve member within said flexible tube and arranged to support a portion of said tube throughout its circumference, said rigid sleeve member having two diametrically disposed openings adjacent said vibration transmitting portions of said tube, a substantially moisture-proof housing formed integrally with said sleeve member and extended thereacross between said two openings therein, piezo-electric crystal element means disposed within said substantially moisture-proof housing with both the signal sensitive end faces thereof respectively arranged in predetermined spaced relation with respect to the vibration transmitting wall portions of said tube, resilient means for mounting said piezo-electric element means within said housing without introducing variations in the transverse static loading thereof, resilient means secured to the housing and to said mounting means for maintaining the crystal element means in said predetermined spaced relation with respect to said wall portions of the tube, and a quantity of vibration transmitting liquid therein which has the same acoustic impedance as the surrounding water and which fills said housing for coupling the pressure sensitive ends of said crystal element means to said vibration transmitting portions of said flexible tube, said vibration transmitting liquid being inserted in the housing under pressure which exceeds the pressure of the air in said tube thereby to prevent air pockets in said liquid and to avoid azimuthal variations in the dumb-bell shaped response pattern of the hydrophone.

3. In combination with a long flexible tube, a hydrophone within the tube as an integral part thereof and constructed and arranged to provide a uniform dumb-bell-shaped response pattern which extends transversely of the tube from diametrically opposed openings therein, said hydrophone comprising an elongated sleeve member disposed within said tube and having a transversely disposed sleeve portion which terminates in a pair of diametrically opposed flanges disposed respectively within said openings in the tube in flushed relation with respect to the outer peripheral wall thereof, a pair of ring members respectively pressed within said flanges, a pair of plugs respectively molded within said ring members and composed of resilient material having the same acoustic impedance as the surrounding water, a plastic tube disposed within said transverse sleeve and having the ends thereof arranged respectively in abutting engagement with respect to said ring members, an elongated piezo-electric crystal element disposed transversely within said plastic tube, crystal element mounting means interposed between said crystal element and said plastic tube for maintaining the element with the end faces thereof disposed in predetermined spaced relation with respect to said plugs, electrical terminal means operatively connected to said crystal element and extended outwardly of said transversely disposed sleeve portion in sealed relation with respect thereto, and a quantity of vibration transmitting liquid under pressure disposed within said transverse sleeve portion and having the same acoustic impedance as said plugs for coupling the end faces of said crystal element adjacent the plugs acoustically through the plugs to the surrounding water, said liquid being inserted within said transversely disposed sleeve portion under pressure therein in excess of the pressure of the air within the tube thereby to avoid air pockets in the liquid and azimuthal variations in said dumbbell-shaped response pattern of the hydrophone, said mounting means for the crystal element being composed of material having sufficient resiliency to prevent transverse static loading of the crystal element.

4. A microphone unit of the type disclosed comprising, in combination, a substantially cylindrical casting, said casting having a tubular portion diammetrically disposed therein, a crystal microphone arranged within said tubular portion, pair of flexible windows respectively mounted in predetermined spaced relationship with the microphone and sealed in water tight relation in the ends of said tubular portion, and a signal transmissive fluid of the same acoustic impedance as the windows contained under pressure within said tubular portion and between the microphone and said windows whereby sound signals impinging on said windows are transmitted undiminished in phase relationship to said microphone at substantially the same frequency as characterize the signals in water.

* * * * *